(12) United States Patent
Kuhn

(10) Patent No.: US 12,508,694 B2
(45) Date of Patent: Dec. 30, 2025

(54) HAND-HELD DEVICE COMPRISING SENSOR UNIT, FOR CHARACTERIZING A TREATED SUBSTRATE

(71) Applicant: WÜRTH INTERNATIONAL AG, Chur (CH)

(72) Inventor: Thomas Kuhn, Kupferzell-Eschental (DE)

(73) Assignee: WÜRTH INTERNATIONAL AG, Chur (CH)

( * ) Notice: Subject to any disclaimer, the term of this patent is extended or adjusted under 35 U.S.C. 154(b) by 391 days.

(21) Appl. No.: 18/000,667

(22) PCT Filed: Mar. 26, 2021

(86) PCT No.: PCT/EP2021/057970
§ 371 (c)(1),
(2) Date: Dec. 2, 2022

(87) PCT Pub. No.: WO2021/244788
PCT Pub. Date: Dec. 9, 2021

(65) Prior Publication Data
US 2023/0211477 A1    Jul. 6, 2023

(30) Foreign Application Priority Data

Jun. 5, 2020 (DE) .............. 10 2020 115 024.5

(51) Int. Cl.
*B25B 21/00* (2006.01)
*B23Q 15/20* (2006.01)
*B25B 21/02* (2006.01)
*G05B 19/418* (2006.01)

(52) U.S. Cl.
CPC ............ *B25B 21/002* (2013.01); *B23Q 15/20* (2013.01); *B25B 21/004* (2013.01); *B25B 21/02* (2013.01); *G05B 19/4185* (2013.01); *G05B 2219/33274* (2013.01)

(58) Field of Classification Search
CPC ....... B25F 5/00; B25B 21/002; B25B 21/004; B25B 21/02; B23Q 15/20; G05B 19/4185; G05B 2219/33274
See application file for complete search history.

(56) References Cited

U.S. PATENT DOCUMENTS

| 7,036,703 | B2 | 5/2006 | Grazioli et al. |
| 2005/0230130 | A1 | 10/2005 | Strasser et al. |
| 2012/0153001 | A1 | 6/2012 | Bertsch et al. |
| 2013/0204422 | A1 | 8/2013 | Ross et al. |
| 2016/0167186 | A1* | 6/2016 | Chan .................. G05B 19/4185 173/2 |

FOREIGN PATENT DOCUMENTS

DE    10 2018 218 685 A1    4/2020

OTHER PUBLICATIONS

Chinese Office action for Application No. 202180040609.X, dated Aug. 5, 2024, 22 pages.

* cited by examiner

*Primary Examiner* — Michelle Lopez
(74) *Attorney, Agent, or Firm* — Womble Bond Dickinson (US) LLP

(57) ABSTRACT

Handheld device for manually actuating by a user, wherein the handheld device comprises a processing unit which is configured for processing an underground, and a sensor unit which is configured for detecting sensor data which are indicative for a condition of the underground before, during, and/or after processing the underground.

19 Claims, 2 Drawing Sheets

HAND-HELD DEVICE COMPRISING SENSOR UNIT, FOR CHARACTERIZING A TREATED SUBSTRATE

CROSS-REFERENCE TO RELATED APPLICATIONS

This application is the U.S. national phase of International Application No. PCT/EP2021/057970 filed 26 Mar. 2021 which designated the U.S. and claims priority to German Patent Application No. 10 2020 115 024.5 filed 5 Jun. 2020, the entire contents of each of which are hereby incorporated herein by reference.

FIELD OF INVENTION

The invention relates to a handheld device, an arrangement, a method, a computer-readable storage medium, and a software program.

TECHNICAL BACKGROUND

In the context of placing dowels in an underground, the knowledge of the underground in which they shall be placed is of relevance for the planning of the placing process. In particular in the case of renovations or unknown undergrounds, frequently no knowledge about the underground exists.

By means of a consideration of drilling dust, a skilled user can derive a rough information about the underground. From white drilling dust, it may be concluded to a gypsum plate or limestone under some circumstances, from red drilling dust to an underground made of brick, etc. Also by means of certain events during creating the drilling hole, certain conclusions can be drawn: from a poor drilling progress, it may be concluded to concrete, sudden motions during drilling may indicate a hollow stone, a normal drilling progress may indicate a consistent underground.

However, in many cases, the described auxiliary actions do not allow an exact conclusion with respect to the actually present underground and require experience and technical knowledge which some users are lacking. This promotes placing errors and reduces the reliability and the security when placing screws or the like in an unknown underground.

SUMMARY OF THE INVENTION

There may be a need to enable the processing of an underground, in particular forming a drilling hole and/or placing an attachment element in an underground, in a simple and error robust manner.

According to an embodiment of the present invention, a handheld device for manually actuating by a user is provided, wherein the handheld device comprises a processing unit which is configured for processing an underground and a sensor unit which is configured for detecting sensor data which are indicative for a condition of the underground, before, during, and/or after processing the underground.

According to a further embodiment of the present invention, an arrangement is provided, which comprises a handheld device with the above described features and a communication device which is communicatively coupled or couplable with the handheld device, for transferring the sensor data from the handheld device to the communication device, and a determination unit which is configured for determining an information which is indicative for the condition of the underground, based on the transferred sensor data, wherein the communication device is configured for transferring the information to the handheld device, and the handheld device is configured for receiving the information from the communication device.

According to a further embodiment of the invention, a method of operating a handheld device (in particular a handheld device with the above described features) which is manually actuatable by a user for processing an underground is provided, wherein the method comprises, by the handheld device, detecting sensor data which are indicative for a condition of the underground, before, during, and/or after processing the underground by the handheld device, and determining, in particular at the handheld device or at a communication unit which is communicatively coupled with the handheld device, an information which is indicative for a condition of the underground, based on the sensor data.

In a computer-readable storage medium according to an embodiment of the present invention, a program for operating a handheld device which is manually actuatable by a user for processing an underground is stored, which program, when it is executed by one or more processors, comprises and/or performs the above-described method stages.

A software-program (for example formed by one or more computer program elements) according to an embodiment of the present invention for operating a handheld device which is manually actuatable by a user for processing an underground comprises the above-described method stages (and/or performs these or controls these), when it is executed by one or more processors.

Embodiments of the present invention may be realized both by a computer program, i.e. a software, and by one or more special electric circuits, i.e. in hardware or in an arbitrarily hybrid form, i.e. by software components and hardware components.

In the context of the present application, "handheld device" may in particular denote a portable device which can be actuated and carried by hand by a user, and by which a processing of an underground is enabled. In particular, by a handheld device and by applying a driving force, a hole can be drilled in the underground and/or a driving force can be applied to an attachment element which is to be placed in an underground. In particular, the driving force may be a rotary or rotational driving force, optionally superimposed with a translatory driving force. In other words, the handheld device may be configured for rotary driving a processing unit and thus a drill and/or an attachment element. Alternatively, the driving force may also be a purely translatory driving force. A driving force of the handheld device may be a pneumatic, a hydraulic, or an electric driving force, which is generated by a pneumatics unit, a hydraulic unit, or an electric motor, for example, or may be a muscle force of a user. Examples for handheld devices are a battery-powered screwdriver, a battery-powered screw driller, a mechanical screwdriver, an impulse screwdriver, a ratchet screwdriver, a drilling machine, an impulse screwdriver, and a hammer drill (German: ein Akkurschrauber, ein Akku-Bohrschrauber, ein Drehschrauber, ein Impulsschrauber, ein Ratschenschrauber, eine Bohrmaschine, ein Schlagschrauber und ein Hammerbohrer). Further examples for handheld devices are a screwdriver handle, an angled handle, a ratchet, or a torque wrench (German: Drehmomentschlüssel).

In the context of this application, the term "processing unit" may in particular denote a mechanism or an assembly which enables a processing, in particular a material-removing and/or drilling-hole-generating processing, of the underground. In particular, the processing unit may comprise a drill which is received in a chuck (German: Futter), for drilling a drilling hole in an underground. However, it is also possible that the processing unit comprises a bit which is received in the chuck, for actuating a drive in a head of an attachment element for inserting (with or without a predrilling) the attachment element in the underground by the handheld device. After processing the underground by the processing unit, an attachment element, optionally in combination with a dowel, can be placed in the formed drilling hole.

In the context of the present application, "attachment element" in particular denotes a body which can be inserted by the handheld device in an underground or anchoring ground, in particular in a rotating manner. Preferably, the attachment element is a screw, for example a wood screw for inserting in an anchoring ground made of wood. However, alternatively, the attachment element may be a nail or a rivet, for example. The attachment element may be configured to be introduced in the anchoring ground without a predrilling or after forming a predrilling. A rotationally inserted attachment element may comprise a self-cutting or self-trenching exterior thread. The introduction of an attachment element in the underground may be performed with or without a dowel. A dowel may be advantageous, for example when the underground comprises hollow chambers, and a pullout force of an attachment element without a dowel is not sufficiently large due to the hollow chambers.

In the context of the present application, the term "underground" in particular denotes an anchoring ground which is suitable for anchoring an attachment element. In particular, such an anchoring ground may be or comprise a wall, further in particular a vertical wall. Materials for such an anchoring ground are in particular wood or wood materials, or also concrete materials or brickwork materials, metal, or plastic components. Furthermore, such an underground may be an arbitrary composite material made of multiple different material components. The underground may comprise hollow spaces or may be massive (i.e. free from hollow spaces).

In the context of this application, the term "sensor unit" may in particular denote one or more sensor elements for generating sensor data which allow a conclusion to at least one characteristic of the underground which is processed by the handheld device. Such a sensor unit may be configured to enable an optical detection, a force detection, and a temperature detection, a velocity detection and/or an acceleration detection, an acoustic detection, a haptic detection, an electric, magnetic, or electromagnetic detection, etc. It is especially advantageous to combine multiple of the mentioned and other detection mechanisms with each other.

In the context of this application, the term "condition of the underground" in particular may denote each characteristic of the underground which is relevant for processing the underground by the handheld device. In particular, such a condition of the underground may be related to the processing by the handheld device or a placing process for placing an attachment element in the underground. Examples for a condition information with respect to the underground are its material, its solid body characteristic or hollow body characteristic, its hardness, its degree of humidity, etc.

According to an exemplary embodiment of the invention, a handheld device is provided which is equipped with a sensor unit for detecting sensor data which are indicative for the condition of the underground. In this way, the handheld device may capture sensor data before, during, and/or after processing the underground, which allow a conclusion to the underground condition. In this way, a procedure for processing the underground by the handheld device by a user and/or a corresponding post-processing of the processed underground (for example a placing process for placing an attachment element in a previously formed drilling hole) may be adapted with respect to a detected underground condition. Thereby, processing the underground, for example forming a drilling hole and/or placing an attachment element in the underground, may be enabled in a simplified and error-robust manner on basis of objective sensor data. Special knowledges or experiences of a user are dispensable. By the sensor unit being integrated in the handheld device for processing the underground, a user only must operate the handheld device, in order to, in addition to processing the underground by the handheld device, also capture the sensor data for characterizing the underground by the handheld device.

DETAILED DESCRIPTION OF EXEMPLARY EMBODIMENTS

In the following, additional exemplary embodiments of the handheld device, the arrangement, the method, the computer-readable storage medium, and the software program are described.

According to an exemplary embodiment, the handheld device may comprise a determination unit which is configured for determining an information which is indicative for the condition of the underground, based on the sensor data. Thus, according to the described embodiment, the handheld device itself may autonomically evaluate the sensor data and may draw conclusions about the condition of the underground. A further processing of the underground may then be performed under consideration of the determined underground condition.

According to another exemplary embodiment, the handheld device may comprise a communication unit for (in particular wirelessly or wiredly) communicating with a communication device which is communicatively couplable and separate from the handheld device, for transferring the sensor data to the communication device, wherein the communication unit is configured for receiving an information which is indicative for the condition of the underground from the communication device, which is detectable based on the transferred sensor data at the communication device. According to this embodiment, at the handheld device, the sensor data are merely captured and are centrally evaluated at a communicatively coupled communication device. In this way, the handheld device may be designed in a compact and lightweight manner, and the data evaluation from the sensor data which are detected at the handheld device for determining the underground condition may be centrally performed for many handheld devices at a commonly used communication device.

According to an exemplary embodiment, the processing unit may be configured as a drilling unit for drilling a hole in the underground and/or as a placing unit for placing an attachment element in the underground. In particular, the processing unit may be configured for at least partially penetrating in the underground. In particular, the processing unit may comprise a chuck for receiving a drill, which drill may also belong to the processing unit. Hence, the handheld device may be preferably configured as a drilling machine with integrated sensor technology for characterizing the underground to be drilled. Furthermore, it is possible to receive a bit at the chuck, instead of the drill, to screw an attachment element (for example in a previously formed drilling hole) in the underground.

According to an exemplary embodiment, the sensor unit may comprise an optical sensor unit, in particular a camera, for capturing optical sensor data of the underground and/or of the processing unit, in particular of material from an interior of the underground, further in particular of a drilling dust from an interior of the underground. In a corresponding manner, the determination unit for determining the information which is indicative for the condition of the underground may be configured on basis of a color of the interior of the underground which is detected from the optical sensor data. For example, such an optical sensor unit may record an image of the exterior and/or the interior of the drilling hole. Thereby, the drilling quality in the underground may be detected. Furthermore, by an analysis of the drilling dust and/or a drilling hole wall by an optical sensor unit, the material of the underground may be characterized or detected. In particular, such an optical sensor unit may be used for a color determination of the drilling dust. The color of the drilling dust allows conclusions to the material of the underground. For example, white drilling dust may indicate sand-line brick or porous concrete, grey drilling dust may indicate concrete or concrete blocks, red drilling dust may indicate brick, etc. The drilling dust analysis by an optical sensor unit may also deliver an information with respect to a degree of humidity of the underground, in particular a determination, if dry or humid drilling dust is present. Since the degree of humidity of an underground material influences its color and thus is accessible for an optical detection.

According to an exemplary embodiment, the determination unit may be configured for determining an error state of the processing unit from the optical sensor data. For example, by the sensor data of an optical sensor unit in connection with a pattern recognition or the like, it may be detected, if abrasion markings are exposed at a concrete drill.

According to an exemplary embodiment, the sensor unit may comprise a distance measuring unit, in particular a laser sensor or an ultrasonic sensor, for capturing distance data between the handheld device and the underground. In a corresponding manner, the determination unit may be configured for determining the information which is indicative for the condition of the underground on basis of a penetration progress (for example of a drill of the processing unit) which is detected from the distance data, in particular a time dependency of the penetration progress in the underground. For example, a distance sensor may measure a distance between the handheld machine and the underground, and may deliver an information about a drilling progress in this way. For example, when a drill penetrates in a hollow chamber of a hollow chamber stone, an abrupt reduction of the distance may occur, until the drill is advanced to a next balk (German: Steg) of the hollow chamber stone. Therefore, the sensorially captured occurrence of abrupt distance changes may be used as an indicator for the presence of an underground with hollow chambers. The length in time of an abrupt change may serve as a measure for the size of a hollow chamber.

According to an exemplary embodiment, the handheld device may comprise a driving unit for providing a driving energy for driving the processing unit for processing the underground. The sensor unit may comprise a driving energy measuring unit, in particular a revolution counter of a motor of the driving unit, for capturing the driving energy for driving the processing unit. Correspondingly, the determination unit may be configured for determining the information which is indicative for the condition of the underground, in particular of the hardness of the underground and/or of the presence or a dimension of at least one macroscopic hollow space in the underground, on basis of the captured driving energy, in particular a time dependency of the captured driving energy. The harder an underground, the stronger the motor has to work, and the larger may be the driving energy. An abrupt, temporary reduction of the driving energy over a certain time interval may deliver an information about the existence and/or the size of hollow chambers. A motor current, a motor torque, and/or a motor power may be reduced as information sources.

According to an exemplary embodiment, the sensor unit may comprise a pressing force measuring unit for capturing a pressing force of the processing unit at the underground. In particular, the determination unit may be configured for determining the information which is indicative for the condition of the underground, in particular of a hardness of the underground and/or of the presence or a dimension of at least one macroscopic hollow space in the underground, on basis of the captured pressing force, in particular a time dependency of the captured pressing force. The pressing force or the pressing pressure may be measured by a capacitive sensor, for example. The harder the underground, the higher is the required pressing pressure. During a penetration of hollow spaces in the underground, the pressing force is abruptly and temporarily reduced.

According to an exemplary embodiment, the sensor unit may comprise a temperature measuring unit, in particular an infrared sensor, for capturing a temperature of the processing unit during and/or after a penetration in the underground. In particular, the determination unit may be configured for determining a hardness of the underground and/or an error state of the processing unit on basis of the temperature. For example, such a temperature measuring unit may capture the temperature of a drill after forming a drilling hole in the underground. The hotter the drill is after this drilling task, the harder is the underground. By such a temperature measuring unit, also an overheating of the drill can be measured. If the last-mentioned error case is recognized, a corresponding action can be taken (for example outputting a warning, an emergency stop, etc.).

According to an exemplary embodiment, the sensor unit may comprise a humidity measuring unit for capturing a humidity or a degree of humidity of the underground. In a corresponding manner, the determination unit may be configured for determining the information which is indicative for the condition of the underground on basis of the captured humidity. For example, an optical sensor unit may be used for a humidity measurement, since the color of an underground material in a humid state and in a dry state is different. However, it is also possible to use a liquid sensor or a chemical sensor for the humidity measurement. The more humid an underground is, the more complicated may be a placing process of an attachment element. In case of a more humid underground, it may be required to use a longer attachment element or additionally a dowel, for example, to ensure a sufficient placing force.

According to an exemplary embodiment, the determination unit may be configured to determine the information by a comparison of the sensor data with pre-known data sets from a database. Preferably, the database may contain characteristic sensor data for different handheld devices and different undergrounds and/or underground properties. For example, empiric data from experiments, data from model calculations, expert rules and/or elements of artificial intelligence may be used, to assign sensorially determined parameter values of the underground (for example the color of the drilling dust, the pressing force, abrupt changes in the motor power) to properties of the underground (for example material, hardness, hollow space size). Then, by a database comparison, for example by searching a lookup-table, sensor data which are detected by the sensor unit may be assigned to properties of the underground.

According to an exemplary embodiment, the handheld device may comprise a storage unit in which the data sets of the database are stored. Said data sets may also be stored in a storage unit, for example an electronic mass storage, such as a hard disk, of the handheld device itself. The database comparison for determining the information may then be autonomously performed in the handheld device.

According to another exemplary embodiment, the handheld device may comprise a communication unit for (in particular wirelessly or wiredly) communicating with another communication unit which is communicatively couplable and separate from the handheld device, where the data sets of the database are stored. According to this embodiment, the handheld device itself may merely capture sensor data, but may use a communicatively coupled communication device for determining the information resulting therefrom. The coupling between the communication unit of the handheld device and the communication device may for example be performed via a wireless communication network, for example the public internet. Such a wireless communication is also possible in a direct manner, for example by Bluetooth. Furthermore, it is possible to perform such a communication in a wire-bonded manner. According to the described embodiment, by one single communication device, many handheld devices may be simultaneously or sequentially supported in the database comparison. One single central intelligence may then cooperate with many simply configured decentral handheld devices.

According to an exemplary embodiment, the handheld device may comprise a control unit for controlling the handheld device (in particular the processing unit and/or a driving unit of the handheld device) based on the determined information which is indicative for the condition of the underground. The results of the determined underground condition may then form the basis for a subsequent operation of the handheld device for processing the underground. Thus, the hardness of the underground may be a measure for which motor power is adjusted by the control unit. It is also possible to temporarily reduce a torque of a driving motor when reaching the next hollow chamber of the underground.

According to an exemplary embodiment, the handheld device may comprise a user interface for outputting an operation proposal for the handheld device—in particular a proposal for a use of a dowel for the underground and/or an attachment element—based on the determined information which is indicative for the condition of the underground. For example, the user interface may comprise a graphical user interface with a graphic display unit, for example a liquid crystal display. There, a proposal for the processing of the underground, which was previously characterized with respect to its condition, may be output. For example, if it is recognized that the underground is an underground with large hollow spaces, the use of a correspondingly dimensioned dowel in combination with a corresponding attachment element (for example a fitting screw) may be proposed. Thereby, an operation mode which is adapted to the previously unknown underground can be given to the user in an intuitive manner.

According to an exemplary embodiment, the user interface may be configured for outputting the operation proposal for the handheld device—in particular the proposal for the use of the dowel and/or the attachment element for the underground—additionally based on a load requirement which is pregiven by a user for an anchoring of an attachment element in the underground. The user proposal for processing the underground which is characterized with respect to its condition may be advantageously refined, such that, besides the determined underground condition, also a load requirement which is pregiven by a user (for example a guaranteed load capacity or pullout force) is considered. In this way, a failure of an attachment element in the underground can be avoided with a high probability, since both a load occurring in the operation and the actual underground condition can be considered in the user proposal.

According to an exemplary embodiment, the sensor unit may be configured for detecting or recognizing an attachment element to be placed. Advantageously, the handheld device may comprise a control unit which is configured for controlling the processing unit for placing the attachment element based on a result of detecting or recognizing. For example by an optical sensor unit, advantageously combined with a pattern recognition on a camera image, an attachment element which is used with the handheld device can be sensorially recognized (for example a M8 screw of a length 100 mm with a Torx-drive). In combination with a sensorially determined information about the condition of the underground, the recognized attachment element can be considered in an algorithm which, for example using a database information from the supplied input data, correspondingly calculates and subsequently controls the placing of the recognized attachment element.

According to an exemplary embodiment, the handheld device may be a drilling machine. Alternatively or additionally, the handheld device may be a battery-powered screwdriver, a battery-powered screw driller, a mechanical screwdriver, an impulse screwdriver, a ratchet screwdriver, an impact screwdriver and/or a hammer drill, or may comprise a corresponding functionality.

According to an exemplary embodiment, the sensor unit may comprise at least two different sensor types which are configured for detecting sensor data which are indicative for a condition of the underground, independently from each other and according to different sensor principles. The determination unit may then be configured for determining the information based on the sensor data, such that a determined information is only excepted or further used, when it is provided by the at least two different sensor types independently from each other and in accordance with each other. For example, different sensor types may be the above-described optical sensor unit and a force sensor. Due to the different sensor principles assigned to these, the sensor data which are delivered by them may be considered as complementary or independent from each other. Only when a certain property of the underground, for example a characterizing of hollow spaces of the underground, is indicated by both or even all used sensor types with mutual agreement and in accordance, the determined condition of the underground is confirmed or further used, otherwise it may be rejected as not sufficiently reliable. In this way, erroneous outputs can be efficiently suppressed.

According to an exemplary embodiment, in the arrangement, the handheld device may be configured for transferring and the communication device may be configured for receiving and storing the information which documents an actually drilling of drilling holes and an actually placing of attachment elements in the underground, i.e. indicates an actual state of the underground processing. A target state of the underground processing may be predefined and compared with the determined actual state. For example, a deposit of stored data for a construction documentation is possible. The construction documentation indicates which attachment elements are placed in which drilling holes at which positions of the underground. By storing these data for a documentation of an actual construction processing, it may be checked, if target placing data according to a pregiven plan are in accordance with the reality.

According to an embodiment, the method may comprise processing the underground by a robot, wherein the robot performs processing the underground by the handheld device using at least a part of the sensor data. For example, a robot may autonomously execute a pregiven underground processing protocol using the handheld device and the sensor data which are captured by the handheld device. By a handheld device being equipped with sensors according to an embodiment of the invention, it is especially suitable for a robot-operated execution of underground processing tasks. For example, the sensor data may be transferred to the robot. For example, the robot may execute a pregiven underground processing protocol at the underground using the handheld device, for example may create a sequence of drilling holes and may place a respective attachment element in these. The sensor data may enable an especially error-robust operation of the handheld device for the robot. For example, a sensorially captured condition of the underground (for example: "underground is solid concrete") which is in contradiction to the underground processing protocol (for example: "place a wood screw without a predrilling") may be recognized. In this case, a corresponding action may be taken (for example a stop of the underground processing, an output of an error message, etc.).

BRIEF DESCRIPTION OF THE FIGURES

In the following, exemplary embodiments of the present invention are described in detail with reference to the following figures.

DETAILED DESCRIPTION OF THE FIGURES

Figure 1:
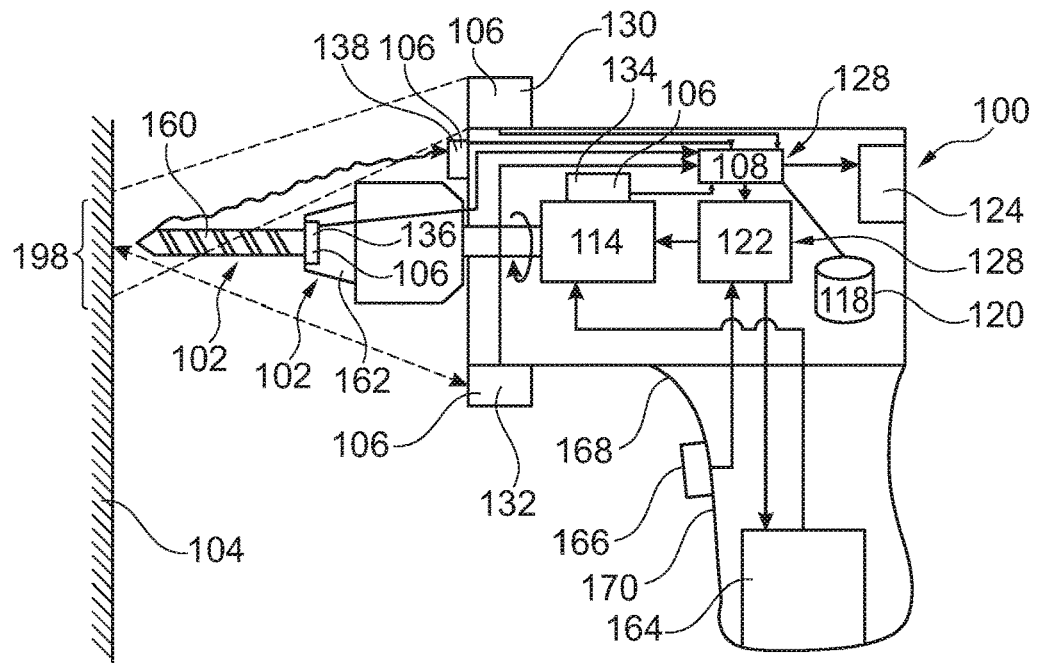
FIG. 1 shows a handheld device which is configured as a drilling machine with an integrated sensor unit and a determination unit for determining a condition of an underground, according to an exemplary embodiment of the invention.

Same or similar components in different figures are provided with the same reference numbers.

Before, referring to the figures, exemplary embodiments of the invention are described, some general aspects of embodiments of the invention shall be explained:

According to an exemplary embodiment of the invention, a handheld device (in particular a drilling machine) may be provided which sensorially recognizes an underground which is processed or which is to be processed by it, and thus enables its characterizing. Sensor data which are detected by the handheld device may be further processed by the handheld device or a communication device which is coupled with it for a data exchange, to derive an information from the sensor data which is characterizing the underground. This enables to give a user an information about a previously unknown or only partially known underground and/or to control and/or to refine a processing operation for processing the underground by the handheld device.

In particular, a combination of a drilling machine and a drill may be equipped with at least one sensor for measuring the drilling hole depth and/or the drilling progress. For example, a sudden and/or a continuous drilling progress may be an indicator for the presence of a hollow chamber stone and/or a solid stone in the underground. When alternatively or additionally a sensor for determining the force which is required for drilling a drilling hole or for placing an attachment element in the underground is provided, it may be sensorially determined, how intensive the handheld device has to work for the drilling process and/or the placing process. This in turn allows conclusions to the underground, in particular to its hardness and/or material. For example, if a porous concrete is present, this may be indicated by a white drilling dust which is captured by optical sensorics and an only low force and/or energy for creating the drilling hole. An underground made of sand-lime solid brick may be recognized by a white drilling dust and an increased force effort for creating the drilling hole. Thus, the combination of a sensorially recognized drilling dust color and a sensorially recognized drilling force is an especially reliable indicator for the condition of the underground.

According to a preferred embodiment, a communication of a handheld device with a communication device is possible, by which a drilling plan and/or a placing plan for a building or an underground is managed. Advantageously, data for the construction documentation can be deposited in this context. Then, it may be checked, if the data of such a plan are in accordance with the reality in the underground.

According to an embodiment of the invention, also a communication with a screwdriver is possible. By the data of the drilling machine and the results of laboratory experiments (which may be stored in a database, for example), the screwdriver may propose at least a torque for the placing of brick screws in the future.

The approach which is here described with a focus on a drilling machine, may also be transferred to other machines and/or handheld devices in an advantageous manner.

Related to a screwing process of an attachment element which is configured as a screw, according to an exemplary embodiment of the invention, tightening the screw may be controlled on basis of the condition of the underground which is sensorially captured and determined by sensor data processing. For example, a torque for placing the attachment element may be adjusted high or low, depending on the distance to the underground, etc.

According to an embodiment, it is also possible to consider a power, a current, a torque, etc. of a driving unit of the drilling machine or another handheld device, to obtain an information about the underground.

In the context of placing dowels, the knowledge of the underground in which they shall be placed, is relevant for the anchoring success. In particular in the case of renovations and unknown undergrounds, according to exemplary embodiments of the invention, an incomplete or completely missing knowledge about the underground may be improved and/or obtained by a sensorially captured and evaluated underground condition information. For example, a camera may autonomously record the emerging drilling dust, so that the material of the underground can be narrowed down by the image data and their evaluation. A force sensor and/or a pressure sensor may detect the pressure which is exerted during drilling, which delivers a further information about the hardness of the underground. When in particular at least two or more sensorially captured values are combined and/or are considered in combination with respect to consistency or discrepancies, an especially reliable and meaningful conclusion to the underground can be drawn. Possible inaccuracies and/or incorrectness with respect to only one sensor measurement may be advantageously avoided by the combination of multiple different sensor measurements.

Data sets in a database which may be compared with sensorially captured sensor data for deriving an information about the condition of the underground may be generated in a laboratory, for example, further in particular in a dowel laboratory. In a dowel laboratory, (for example as basis for a permission of single dowels), dowels may be placed in different undergrounds with corresponding test drillings. The drilling progress, the color of the drilling dust, etc. may be captured, and the data may be centrally stored in a database (for example on a server).

When a user (for example a craftsman) creates a drilling hole, his drilling machine captures corresponding sensor data, transfers these sensor data to said server, and gets feedback and/or a prognosis from there, which underground is present or is probably present. Correspondingly, the craftsman may then select a dowel and/or gets a proposal which dowel is suitable for this underground.

In particular, a handheld device which is configured as a drilling machine may recognize the exerted force for creating the drilling hole by a force sensor. Thereby, for example conclusions to the hardness of the underground (especially in case of a brickwork) may be drawn. By a distance measuring unit in combination with a force sensor, in particular a hole pattern of the underground (for example brickwork) may be recognized. With a camera for determining the color of the drilling dust, a characterizing of the underground can then be performed.

For example, when such a handheld device which is configured as a drilling machine communicates with a tangential screwdriver for placing concrete screws, the tangential screwdriver may adjust the correct torque which is suitable for the characterized underground, to prevent overwinding the concrete screw in the drilling hole and/or shearing-off the concrete screw head.

Hence, one or more additional sensors may be provided in and/or at the drilling machine, wherein an arbitrary combination is possible, depending on the application. Examples for advantageously implementable sensor units are:
- a distance measuring unit for measuring a distance between the underground and the drilling machine
- a force sensor for measuring the pressing force of the handheld device upon the underground
- a camera for capturing the drilling dust when drilling a hole in the underground
- capturing motor data, for example current, power, torque, revolution speed
- acceleration sensors, in particular three-dimensional acceleration sensors
- infrared sensor for capturing infrared radiation which is emitted by a heated driller of the handheld device, for example A distance measuring unit may be configured as an ultrasonic sensor, a laser beam sensor, or a 3D acceleration sensor, for example. By such a distance measuring unit, in combination with a sensor, a hole pattern of the underground may be recognized. By the distance sensor, the drilling progress may be captured, in particular if sudden progresses occur, which suggests hollow chamber stones.

Furthermore, a drilling machine or another handheld device can recognize the exerted force for creating the bore hole by a force sensor. Thereby, conclusions to the solidity of the underground (mainly in case of a brickwork) can be drawn.

The capture of motor data allows the conclusion how intensely the handheld device has to work for fulfilling the processing task (in particular a drilling task). This in turn allows conclusions to the underground. For the example of porous concrete, the combination of white drilling dust and an only low force and/or energy for creating the drilling hole is to be expected. When sand-lime solid brick is present, white drilling dust and an increased force effort for creating the drilling hole occur.

An infrared sensor may be provided for capturing the temperature of the drill after the drilling process.

With a camera or the like, determining the color of the drilling dust is possible, and on this basis, a characterization of the underground is possible. A camera records the emerging drilling dust and may then narrow down the material of the underground. Advantageously, this can be combined with a determination, if dry or humid drilling dust is present. When all these values are combined, conclusions to the underground are possible.

Also, the selection of a suitable dowel may be performed by a determined knowledge of the underground condition. Advantageously, this can be completed by an input of the required load by a user. Thereby, better and/or more suitable proposals by a software for the present application case and for the present underground, as well as the load desired by the user may be specifically given, for example by a software-based proposed dowel system.

For providing a communication between a handheld device (for example a drilling machine) and a communication device (for example a computer), a WLAN-connection or a data cable may be used, for example.

In such a communication, it may be stored, at which positions in space which attachment element was placed. Furthermore, it may be stored if it was drilled in a reinforcement during drilling. Also, data for a construction documentation may be stored. Then, it may be determined, if data according to a plan are in accordance with the reality.

A further application of a drilling machine according to an exemplary embodiment of the invention relates to the scenario, that the drilling machine recognizes a component to be placed. The drilling machine may then propose at least a torque for brickwork screws in future by the data of the drilling machine and the results of laboratory experiments and may even control the screwing process corresponding to the determined underground condition. In case of a wood screw, the torque may be adjusted high and low, depending on the distance to the underground, etc. In contrast, in case of a concrete screw or a concrete anchor, the torque which is correct for this underground may be adjusted for placing.

FIG. 1 shows a handheld device 100 which is configured as a drilling machine with an integrated sensor unit 106 and a determination unit 108 for determining a condition of an underground 104, according to an exemplary embodiment of the invention.

The shown handheld device 100 which is configured as a drilling machine comprises a drill 160 which is replaceably mounted at a chuck 162. The chuck 162, and consequently the drill 160, are rotary driven by a driving unit 114 which is configured as an electric motor, to create a drilling hole in an underground 104 (for example a concrete wall or a hollow brick wall). The driving unit 114 receives driving energy from an accumulator 164 or alternatively a cable connection to a current network. The driving unit 114 is controlled by a control unit 122, wherein a user can influence the control of the handheld device 100 by the control unit 122 by actuating an actuation unit 166 at a handle 170. The mentioned components are fixed at and/or in a housing 168.

The handheld device 100 which is shown in FIG. 1 is configured as a portable drilling device for manually actuating by a user and comprises a processing unit 102 which is configured for drillingly processing the underground 104, i.e. for forming a drilling hole in the underground 104. The processing unit 102 is made of the drill 160 and the chuck 162. In operation, the processing unit 102 penetrates with its drill 160 the underground 104, when a drilling hole is drilled in the underground 104.

Moreover, the handheld device 100 contains a sensor unit 106 which is made of multiple single sensors according to FIG. 1, which is configured for detecting sensor data which are indicative for a condition of the underground 104, before, during, and/or after processing the underground 104 by the processing unit 102. For example, the condition of the underground 104 denotes the material of the underground 104, the hardness of the underground 104, and the presence or absence and possibly the size of hollow chambers in the underground 104. The sensor unit 106 is described in more detail below.

Furthermore, the handheld device 100 comprises a determination unit 103 which is for example configured as a processor 128, as a plurality of processors 128, or as a part of a processor 128. The determination unit 108 is configured for determining an information which is indicative for the condition of the underground 104, i.e. an information which is indicating the condition of the underground 104, based on the sensor data which are detected by the sensors of the sensor unit 106 and are supplied to the determination unit 108.

As shown in FIG. 1, the sensor unit 106 comprises an optical sensor unit 130 which is configured as a camera which is mounted to the housing 168 in the illustrated embodiment. It serves for capturing optical sensor data of the underground 104, i.e. records an image 198 of a processed region of the underground 104. The camera may also record an image of the drill 160 or a part of it. It is especially preferred, that drilling dust is detected by the camera, which leaves out of an interior of the underground 104 during drilling a drilling hole by the processing unit 102. In this context, the determination unit 108 serves for determining the information which is indicative for the condition of the underground 104 on basis of a color of the drilling dust from the interior of the underground 104 which is determined from the optical sensor data. From the color of the drilling dust, it may be concluded to the material of the underground 104, in particular when pre-stored data sets referring to this are contained in a database 120 (which may also be configured according to FIG. 2, for example). According to FIG. 1, the database 120 may be stored in a storage unit 118 of the handheld device 100.

It is also possible that the determination unit 108 recognizes a possible error state of the processing unit 102 by means of the optical sensor data. For example, from an image recorded by the camera, it may be recognized that abrasion markings of the drill 160 are exposed which indicate an abrasion of the drill 102. At a user interface 124 which is configured as a display unit, for example, an alarm can be output to a user, that the drill 160 is worn and shall be replaced.

The camera can also be used as a humidity measuring unit for capturing a humidity of the underground 104, since a color of the drilling dust which is capturable by the camera differs in a humid state and in a dry state. Hence, also the humidity content of the underground 104 may be determined or at least estimated by the determination unit 108 by means of the sensor data.

Furthermore, the sensor unit 106 contains a distance measuring unit 132 which is configured as a laser sensor or ultrasonic sensor, for example. It serves for capturing distance data between the underground 104 and the handheld device 100. In a corresponding manner, the determination unit 108 functions for determining the information which is indicative for the condition of the underground 104 on basis of a penetration progress of the drill 160 in the underground 104 which is determined from the distance data. In particular, a time dependency of the penetration progress of the drill 160 in the underground 104 is of interest, since the existence of hollow spaces in the underground 104 is derivable from it. If the distance changes in a sudden manner, the drill 160 has entered a new hollow space. After reaching the next balk in the underground 104, the distance reduces very slightly over time, until the next hollow space and thus the next sudden distance reduction is reached.

As already mentioned, the handheld device 100 contains a driving unit 114 which is here configured as an electric motor, for providing a driving energy for driving the processing unit 102, in particular for driving the chuck 162 and consequently the drill 160 which is non-rotatably connected with it. As shown in FIG. 1, the sensor unit 106 further comprises a driving energy measuring unit 134 which may be configured as a revolution counter of the electric motor of the driving unit 114, for example. The driving energy measuring unit 134 serves for capturing the driving energy for driving the processing unit 102. The determination unit 108 in turn functions for determining the information which is indicative for the condition of the underground 104 in form of a hardness of the underground 104 and/or the presence or a dimension of at least one macroscopic hollow space (see reference sign 116 in FIG. 3 to FIG. 5) in the underground 104 on basis of a time dependency of the captured driving energy. If the driving energy suddenly reduces, the drill 160 has entered a new hollow space. After reaching the next balk in the underground 104, the driving energy increases again, until the next hollow space is reached, and the driving energy is temporarily reduced again.

Moreover, the sensor unit 106 comprises a pressing force measuring unit 136 for, for example capacitively, capturing a pressing force of the processing unit 102 upon the underground 104. Correspondingly, the determination unit 108 serves for determining the information which is indicative for the condition of the underground 104, namely a hardness of the underground 104 and/or the presence or a dimension of at least one macroscopic hollow space 116 in the underground 104 on basis of a time dependency of the captured pressing force. When the pressing force suddenly reduces, the drill 160 has entered a new hollow space. After reaching the next balk in the underground 104, the pressing force is increased again, until the next hollow space is reached.

Furthermore, the sensor unit 106 comprises a temperature measuring unit 138, which may be configured as an infrared sensor. Thus, the temperature measuring unit 138 serves for capturing a temperature of the processing unit 102, in more detail of the drill 160, during and/or after a penetration in the underground 104. Correspondingly, the determination unit 108 is configured for determining a hardness of the underground 104 and/or an error state of the processing unit 102 on basis of the captured temperature. The higher the hardness of the underground 104 is, the more distinct is the temperature increase of the drill 160 when creating the drilling hole in the underground 104. When a temperature of the drill 160 above a permitted range is detected, a warning message may be output to a user by the user interface 124, or even the operation of the handheld device 100 may be stopped by an emergency stop.

The sensor data of the diverse sensors of the sensor unit 106 are supplied to the determination unit 108. The determination unit 108 is configured to determine the information by a comparison of the sensor data with pre-known data sets from the own database 120 of the handheld device. As already described, the handheld device 100 comprises a storage unit 118 for this purpose, in which the data sets of the database 120 are stored. The database 120 may be filled with data sets which are obtained in a laboratory by experimental underground processing procedures, for example. In particular, the database 120 may contain assigned sensor data and/or assigned properties of different undergrounds 104 for different handheld devices 100 and for different sensor units 106. Then, a data comparison between the sensor data and the data in the database 120 allows a characterization of the underground 104.

Advantageously, the control unit 122 is configured for controlling the processing unit 102 based on the information which is determined and indicative for the condition of the underground 104. In other words, the control unit 122 may take the sensor-based characterizing of the underground 104 as an opportunity to correspondingly adapt a subsequent processing of the underground 104 by the drill 160 or by a bit for placing an attachment element in a drilling hole. For example, when the characterizing of the underground 104 yielded the presence and the dimension of hollow spaces 116, before reaching the next hollow space 116 by the drill 160, the driving energy of the driving unit 114 can be regulated down.

As already described, the handheld device 100 comprises a display unit or a graphical user interface 124 for outputting an operation proposal for the handheld device 100. Thereby, in particular a proposal for a use of a dowel for an underground 104 which is characterized with respect to its condition, may be output to a user in an intuitive manner. This proposal may be created based on the information which is determined and indicative for the condition of the underground 104. The user interface 124 may be configured for outputting the operation proposal for the handheld device 100 additionally based on a load requirement which is pregiven by a user for an anchoring of an attachment element in the underground 104. In other words, a user may input a load requirement, for example by the user interface 124, which shall at least be reached by a placing task for an attachment element. The control unit 122 may then control the operation of the handheld device 100 such that the sensorially characterized underground 104 and the pregiven load requirement are considered in the output proposal and/or the submitted recommendation.

When after forming a drilling hole an attachment element, for example a screw, shall be placed in the drilling hole, the sensor unit 106 may be configured for recognizing or detecting the attachment element to be placed. The control unit 122 may then be configured for controlling the processing unit 102 for placing the attachment element based on a result of detecting or recognizing.

In particular the combinatorial detection of multiple different or complementary sensor data by a sensor unit 106 which includes different sensor types 130, 132, 134, 136, 138 (for example an optical sensor and a force sensor), has proven as a powerful way to exclude or at least strongly suppress artificial and possibly erroneous conclusions with respect to the condition of the underground 104 which, under unfavorable circumstances, under consideration of only one sensor type, can lead to erroneous outputs. For example, the determination unit 108 may be configured to accept a conclusion about a condition of the underground 104 due to sensor data only as correct in the case that at least two different sensor types 130, 132, 134, 136, 138 indicate this condition of the underground 104 in accordance with each other.

Figure 2:
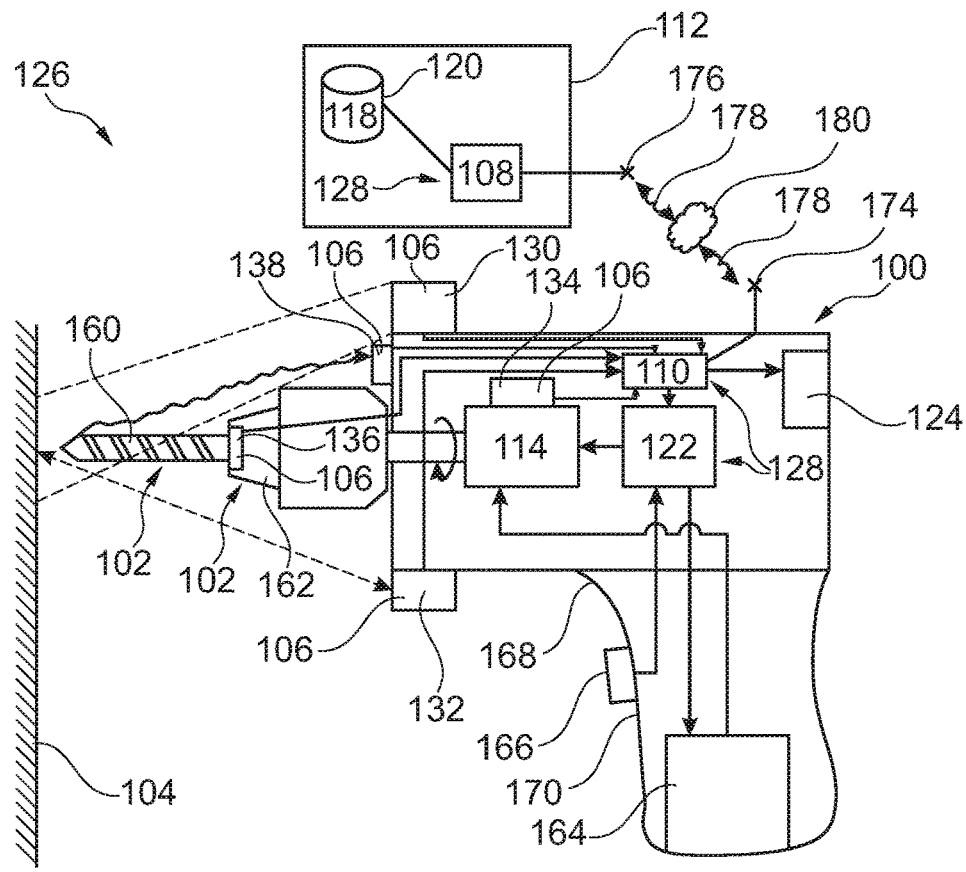
FIG. 2 shows an arrangement of a handheld device which is configured as a drilling machine with an integrated sensor unit and a communication device which is communicatively coupled with it, with a determination unit for determining a condition of an underground, according to another exemplary embodiment of the invention.

FIG. 2 shows an arrangement 126 of a handheld device which is configured as a drilling machine with an integrated sensor unit 106 and a communication device 112 which is communicatively coupled with it, with a determination unit 108 for determining a condition of an underground 104, according to another exemplary embodiment of the invention.

Thus, the arrangement 126 which is shown in FIG. 2 comprises the handheld device 100 according to FIG. 2 which is configured as a drilling machine and the communication device 112 which is communicatively coupled with the handheld device 100 for transferring the sensor data from the handheld device 100 to the communication device 112. Furthermore, according to FIG. 2, a determination unit 108 forms a part of the communication device 112 (and not of the handheld device 100). Said determination unit 108 is configured for determining an information which is indicative for the condition of the underground 104, based on the transferred sensor data. Moreover, the communication device 112 is configured for transferring the information to the handheld device 100, and the handheld device 100 is configured for receiving the information from the communication device 112. According to FIG. 2, the handheld device 100 is equipped with a communication unit 110, which is coupled via a sending-/receiving-antenna 174 with a sending-/receiving-antenna 176 of the communication device 112 in a wireless manner, for example. The communication between the communication device 112 and the handheld device 100 may be performed in a wireless manner, i.e. by electromagnetic waves 178. The communication device 112 and the handheld device 100 may be coupled with each other by a communication network 180, for example the public internet.

Thus, according to FIG. 2, the handheld device 100 and the communication device 112 are formed as separate devices which are freely usable at different locations. The handheld device 100 determines sensor data by a sensor unit 106, for example in the manner which is shown in FIG. 1, which may serve for a characterization of the condition of the underground 104. However, according to FIG. 2, these are not evaluated in the handheld device 100 itself. Instead, the sensor data are transferred from the handheld device 100 to the communication device 112 in a wireless manner. In the communication device 112, the evaluation of the sensor data is performed in the determination unit 108 which is provided there. For this purpose, the determination unit 108 of the communication device 112 may also use data sets in a data base 120 which are stored in a storage unit 118 (for example a hard disk or another electronic mass storage) of the communication device 112. The communication device 112 may transfer its conclusions about the condition of the underground 104 to the handheld device 100 in a wireless manner. Subsequently, the handheld device 100 may control and/or adjust the operation of the handheld device 100 by its control unit 122 under consideration of the determined condition of the underground 104, for example in the manner which is described in FIG. 1. It is also possible, that the handheld device 100 indicates a corresponding output via the user interface 124 to a user of the handheld device 100.

According to FIG. 2, the communication device 112 may be configured as a central server, for example, which may operate multiple decentral handheld devices 100. In this way, it is possible to provide a central intelligence and a central database 120 in the communication device 112 and to form the numerous portable handheld devices 100 in a manner which is compact, lightweight, and simple in hardware. All these handheld devices 100 may be supplied via a single central server in form of the communication device 112 with an evaluation logic for centrally determining the condition of the underground 104 which is respectively processed by them, on basis of the sensor data which are decentrally captured by them.

According to a further preferred embodiment, by the arrangement 126, a correct execution of an underground-processing-plan may be ensured by the handheld device 100 which is shown in FIG. 2. Such a plan may be stored in the database 120 of the communication device 112, and therefore at a central location. Furthermore, such a plan may be known to a craftsman which operates the handheld device 100 at a decentral position for processing the underground 104 which is shown in FIG. 2. For example, such a plan may pre-give the anchoring of certain attachment elements (for example screws) in a predefined manner for a multiplicity of positions at the underground 104. Due to the communicatively coupling between the decentral handheld device 100 and the communication device 112 which is formed as a central server, the handheld device can transfer the actual positions and types of the attachment elements (screws, dowels, etc.) which are used for this purpose to the communication device 112. Thus, the handheld device 100 may be configured for transferring, and the communication device 112 may be configured for receiving and storing—in the database 120—an information which documents a drilling of drilling holes and a placing of attachment elements in the underground 104. By a comparison of the actual situation, i.e. the data which are transferred from the handheld device 100 to the communication device 112, with the target situation which is defined by the placing plan which is stored in the database 120, it can be ensured, that the pregiven plan is correctly implemented at the underground 104 by the handheld device 100.

Figure 3:
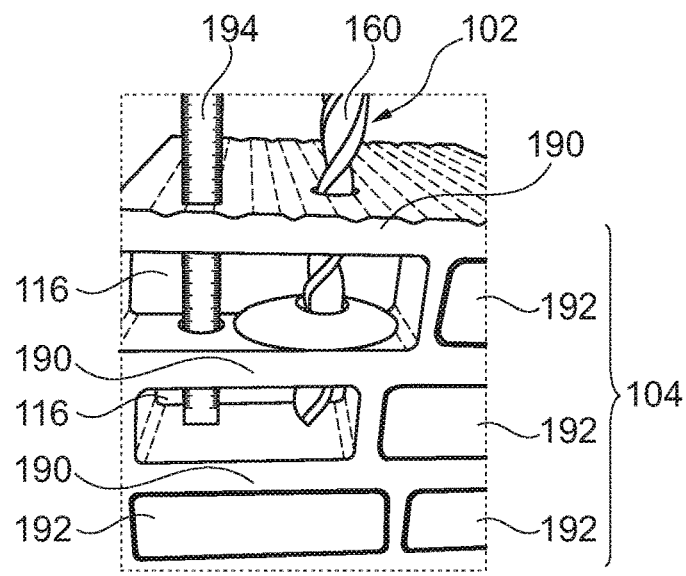
FIG. 3 to FIG. 5 show undergrounds which are measured in a laboratory, which are processed by a handheld device, for filling a database with data sets for correlating conditions of undergrounds with sensor data and characteristics of a processing of such undergrounds with a handheld device according to an exemplary embodiment of the invention.
Figure 4:
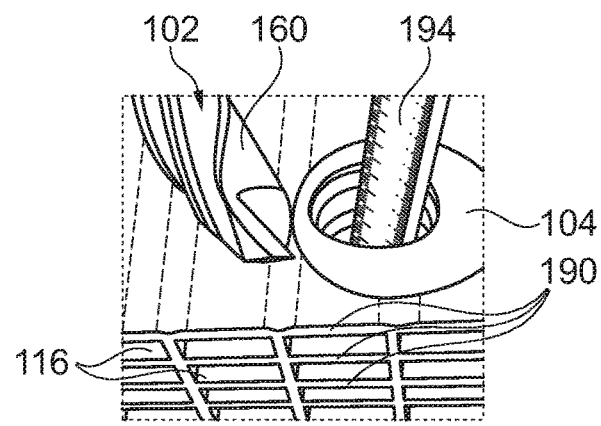
Figure 5:
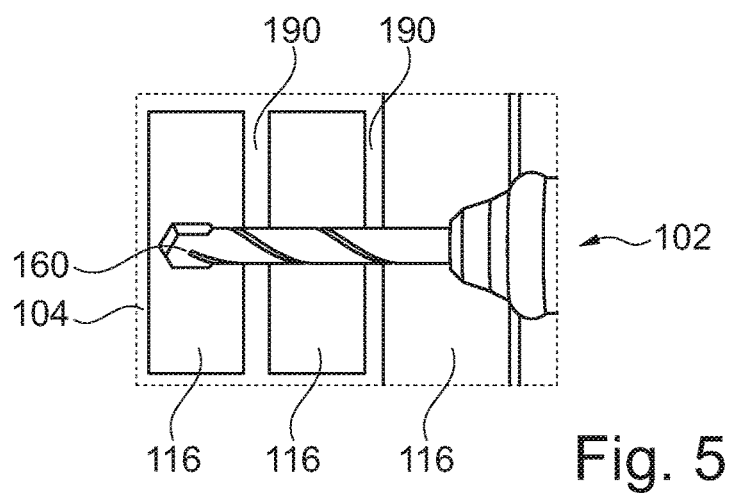

FIG. 3, FIG. 4, and FIG. 5 show undergrounds 104 which are measured in a laboratory, which were processed by a handheld device 100. The measured undergrounds 104 serve for filling a database 120 with data sets for correlating the conditions of the underground 104 and characteristics of a processing of such undergrounds 104 with a handheld device 100 according to an exemplary embodiment of the invention.

According to FIG. 3, a cross-sectional view of an underground 104 with hollow spaces 116 and with balks 190 arranged in between are shown. Some of the hollow spaces 116 may be filled with an insulation 192, for example. By a meter stick 194 or the like, a geometry of the underground 104 may be measured, for example an extension of the hollow spaces 116. Furthermore, by a drill 160, a drilling hole may be formed in the underground 104 and meanwhile sensor data may be recorded. FIG. 4 and FIG. 5 show for the corresponding views.

According to FIG. 3 to FIG. 5, drilling experiments at the undergrounds 104 may be performed, for example. The sensor data may be recorded using the sensor unit 106, as shown and described in FIG. 1 and FIG. 2. At the same time, the test undergrounds 104 may be metrologically characterized, for example an information about the arrangement of the hollow spaces 116, the positions of the insulation 192, as well as the positions of the balks 190 can be assigned to the sensor data. All this information may fill a database 120 with data sets which can then be used for determining the condition of the respective underground 104 by a database comparison based on capturable sensor data, according to FIG. 1 of FIG. 2.

Since a handheld device according to an exemplary embodiment of the invention may be equipped with one or preferably multiple sensors, the handheld device is especially suitable for an automatic operation, for example using a robot. According to an exemplary embodiment of the invention, a corresponding robot-supported operation of the handheld device may be performed as follows:

the robot moves the handheld device to a pregiven target location at the underground.

The sensor or the sensors capture a contact of the handheld device with the underground.

The underground processing procedure (for example a drilling procedure) is performed in case of a recognized contact by the robot.

The at least one sensor captures reaching a pregiven target of the underground processing procedure (for example reaching a desired placing depth), whereby a termination of the underground processing procedure (for example a placing procedure) is triggered.

Subsequently, the robot moves the handheld device to a next target location (in particular at the same underground), to perform a subsequent underground processing procedure. In this way, for example, the robot can execute a pregiven protocol (for example a drilling protocol) of multiple underground processing procedures, using the handheld device.

If the presence of an underground which is unsuitable or erroneous for an underground processing procedure should be sensorially recognized, in which the underground processing procedure cannot be properly performed (for example recognizing a solid concrete underground, when a wood screw shall be placed without a predrilling), the underground processing procedure may be interrupted, aborted, or stopped, and an error message can be optionally output.

Supplementary, it is to be noted, that "comprising" does not exclude other elements or steps, and "a" or "an" does not exclude a plurality. Furthermore, it is noted, that features or steps which are described with reference to one of the above embodiments can also be used in combination with other features or steps of other above-described embodiments. Reference signs in the claims are not to be construed as limitation.

The invention claimed is:

1. Drilling machine for manually actuating by a user, wherein the drilling machine comprises:
a drilling unit which is configured for drilling a drilling hole in an underground;

a sensor unit which is configured for detecting sensor data which are indicative for a condition of the underground, before, during, and/or after processing the underground;

a determination unit which is configured for determining an information which is indicative for the condition of the underground, based on the sensor data, wherein the determination unit is configured to select a dowel based on the determined information which is indicative for the condition of the underground; and a user interface for outputting the selected dowel for the underground.

2. Drilling machine according to claim 1, wherein the drilling machine is configured so that, when a user creates the drilling hole, the drilling machine captures corresponding sensor data, transfers these sensor data to a server, and receives a prognosis from there, which underground is present or probably present.

3. Drilling machine according to claim 1, comprising a communication unit for, in particular wirelessly or wiredly, communicating with a communication device which is communicatively couplable and separate from the drilling machine, for transferring the sensor data to the communication device, wherein the communication unit is configured for receiving an information which is indicative for the condition of the underground from the communication device, which is determinable at the communication device based on the transferred sensor data.

4. Drilling machine according to claim 1, wherein the drilling unit is configured for at least partially penetrating the underground.

5. Drilling machine according to claim 1, wherein the sensor unit comprises an optical sensor unit, in particular a camera, for capturing optical sensor data of the underground and/or of the drilling unit, in particular of material from an interior of the underground, further in particular of drilling dust from an interior of the underground, in particular wherein the determination unit is configured for determining the information which is indicative for the condition of the underground on basis of a color of the material of the interior of the underground which is determined from the optical sensor data, and/or for determining an error state of the drilling unit from the optical sensor data.

6. Drilling machine according claim 1, wherein the sensor unit comprises a distance measuring unit, in particular a laser sensor or an ultrasonic sensor, for capturing distance data between the drilling machine and the underground, in particular wherein the determination unit is configured for determining the information which is indicative for the condition of the underground on basis of a penetration progress in the underground which is determined from the distance data, in particular from a time dependency of the penetration progress.

7. Drilling machine according to claim 1,
wherein the drilling machine comprises a driving unit for providing driving energy for driving the drilling unit;
wherein the sensor unit comprises a driving energy measuring unit, in particular a revolution counter or a current meter of a motor of the driving unit, for capturing the driving energy for driving the drilling unit;
in particular wherein the determination unit is configured for determining the information which is indicative for the condition of the underground, in particular a hardness of the underground and/or a presence or a dimension of at least one hollow space in the underground, on basis of the captured driving energy, in particular a time dependency of the captured driving energy.

8. Drilling machine according to claim 1, wherein the sensor unit comprises a pressing force measuring unit for capturing a pressing force of the drilling unit upon the underground, in particular wherein the determination unit is configured for determining the information which is indicative for the condition of the underground, in particular a hardness of the underground and/or the presence or a dimension of at least one hollow space in the underground, on basis of the captured pressing force, in particular a time dependency of the captured pressing force.

9. Drilling machine according to claim 1, wherein the sensor unit comprises a temperature measuring unit, in particular an infrared sensor, for capturing a temperature of the drilling unit during and/or after a penetration in the underground, in particular wherein the determination unit is configured for determining a hardness of the underground and/or an error state of the drilling unit on basis of the temperature.

10. Drilling machine according to claim 1, wherein the sensor unit comprises a humidity measuring unit for capturing a humidity of the underground, in particular wherein the determination unit is configured for determining the information which is indicative for the condition of the underground on basis of the captured humidity.

11. Drilling machine according to claim 1, wherein the determination unit is configured to determine the information by a comparison of the sensor data with pre-known data sets from a database, in particular wherein the drilling machine comprises a storage unit in which the data sets of the database are stored, and/or in particular comprising a communication unit for, in particular wirelessly or wiredly, communicating with a communication device which is communicatively couplable and separate from the drilling machine, in which the data sets of the database are stored.

12. Drilling machine according to claim 1, comprising a control unit for controlling the drilling machine, in particular the drilling unit, based on the determined information which is indicative for the condition of the underground.

13. Drilling machine according to claim 1, comprising at least one of the following features:
wherein the user interface for outputting the operation proposal for the drilling machine is additionally configured based on a load requirement which is pregiven by a user for an anchoring of an attachment element in the underground;
wherein the sensor unit is configured for recognizing an attachment element to be placed, and comprising a control unit which is configured for controlling the drilling unit for placing the attachment element based on a result of recognizing;
wherein the sensor unit comprises at least two different sensor types which are configured independently from each other and according to different sensor principles for detecting sensor data which are indicative for a condition of the underground; and wherein the determination unit for determining the information based on the sensor data is configured such that a determined information is only excepted when it is provided by the at least two different sensor types independently from each other and in accordance with each other.

14. Arrangement comprising:
a drilling machine according to claim 1; and
a communication device which is communicatively coupled or couplable with the drilling machine for transferring the sensor data from the drilling machine to the communication device, and comprises a determination unit which is configured for determining an information which is indicative for the condition of the underground based on the transferred sensor data;
wherein the communication device is configured for transferring the determined information to the drilling machine, and the drilling machine is configured for receiving the determined information from the communication device.

15. Arrangement according to claim 14, wherein the drilling machine is configured for transferring and the communication device is configured for receiving and storing an information which documents a drilling of drilling holes and a placing of attachment elements in the drilling holes in the underground.

16. Method of operating a drilling machine which is manually actuatable by a user, for example according to claim 1, for processing an underground, wherein the method comprises:
  detecting, by the drilling machine, sensor data which are indicative for a condition of the underground, before, during, and/or after processing the underground, by the drilling machine; and
  determining, for example at the drilling machine or at a communication device which is communicatively coupled with the drilling machine, an information which is indicative for a condition of the underground, based on the sensor data;
  selecting a dowel based on the determined information which is indicative for the condition of the underground; and
  outputting the selected dowel for the underground.

17. Method according to claim 16, comprising at least one of the following features:
  wherein the method comprises processing the underground by a robot, wherein the robot performs processing the underground by the drilling machine using at least a part of the sensor data, in particular under execution of a pregiven underground processing protocol;
  wherein in the method, when a user creates a drilling hole, the drilling machine captures corresponding sensor data, transfers these sensor data to a server, and receives a prognosis from there, which underground is present or probably present.

18. Computer-readable storage medium, in which a program for operating a drilling machine which is manually actuatable by a user for processing an underground is stored, which program, when it is executed by one or more processors, executes and/or controls the method according to claim 16.

19. Software program for operating a drilling machine which is manually actuatable by a user, for processing an underground, which software program, when it is executed by one or more processors executes and/or controls the method according to claim 16.

\* \* \* \* \*